United States Patent
Ehlert

(10) Patent No.: US 7,040,478 B2
(45) Date of Patent: May 9, 2006

(54) STEERABLE DIVERTER SYSTEM

(75) Inventor: Ronald C. Ehlert, Wyoming, MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 62 days.

(21) Appl. No.: 10/710,824

(22) Filed: Aug. 5, 2004

(65) Prior Publication Data
US 2005/0040009 A1 Feb. 24, 2005

Related U.S. Application Data

(60) Provisional application No. 60/492,493, filed on Aug. 5, 2003.

(51) Int. Cl.
B65G 47/10 (2006.01)
(52) U.S. Cl. .................... 198/370.09; 198/369.4
(58) Field of Classification Search ............ 198/369.4, 198/370.01, 370.09, 371.3
See application file for complete search history.

(56) References Cited

U.S. PATENT DOCUMENTS

| | | | |
|---|---|---|---|
| 3,910,402 A | 10/1975 | Dean | |
| 3,983,988 A | 10/1976 | Maxted et al. | |
| 4,264,002 A * | 4/1981 | Van Der Schie | 198/369.4 |
| 4,372,435 A * | 2/1983 | Bradbury | 198/369.4 |
| 4,509,636 A | 4/1985 | Godbois | |
| 4,541,520 A | 9/1985 | Greenlee, III | |
| 4,598,815 A | 7/1986 | Adama | |
| 4,703,844 A | 11/1987 | Jahns | |
| 4,746,003 A | 5/1988 | Yu et al. | |
| 4,913,277 A | 4/1990 | Zürgiebel et al. | |
| 4,949,837 A | 8/1990 | Huber | |
| 5,012,914 A | 5/1991 | Berends et al. | |
| 5,029,693 A | 7/1991 | Williams | |
| 5,086,906 A | 2/1992 | Ludke | |
| 5,117,961 A | 6/1992 | Nicholson | |
| 5,150,781 A | 9/1992 | Deisenroth et al. | |
| 5,222,585 A * | 6/1993 | van der Werff | 198/369.4 |
| 5,551,543 A | 9/1996 | Mattingly et al. | |
| 5,921,374 A | 7/1999 | Takino et al. | |
| 5,971,133 A | 10/1999 | Wilkins | |
| 6,220,420 B1 | 4/2001 | Jan et al. | |
| 6,619,465 B1 | 9/2003 | Gebhardt | |

FOREIGN PATENT DOCUMENTS

EP 0 251 391 B1 1/1988

* cited by examiner

Primary Examiner—James R. Bidwell
(74) Attorney, Agent, or Firm—Van Dyke, Gardner, Linn & Burkhart, LLP

(57) ABSTRACT

A diverter system for diverting articles being conveyed along the diverter system includes a plurality of diverter wheels arranged between opposite sidewalls of the diverter system. The diverter wheels are rotatably driven by a motorized roller and a plurality of drive members or bands reeved around the motorized roller and respective ones of the diverter wheels. The diverter wheels are steerable in response to pivotal or rotational movement of a drive gear that engages a gear plate of at least one of the wheels. The resulting pivotal movement of the at least one wheel causes a translational movement of a rack member extending along the row of diverter wheels which, in turn, causes a corresponding pivotal movement of the other wheels engaged with the rack member.

34 Claims, 14 Drawing Sheets

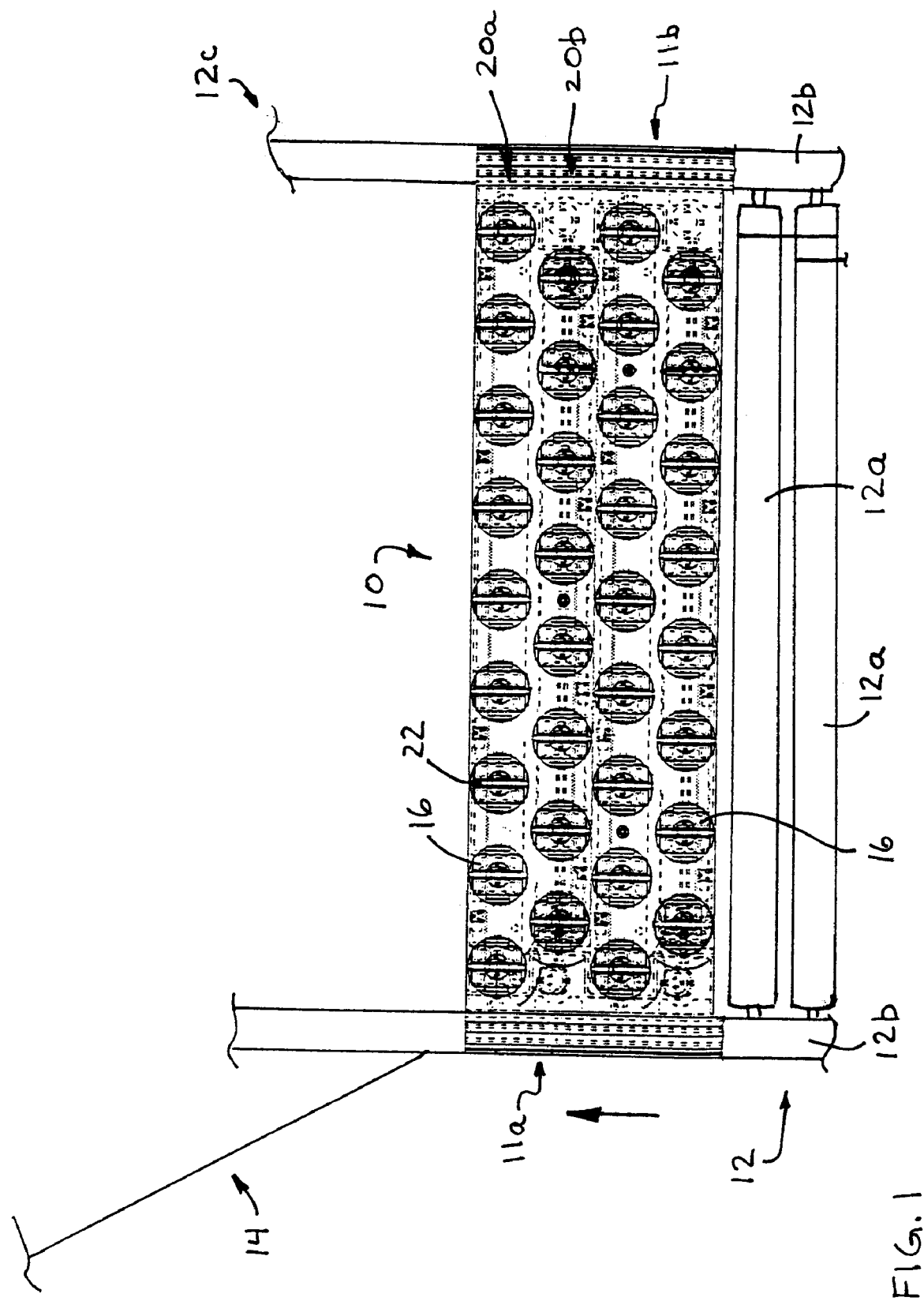

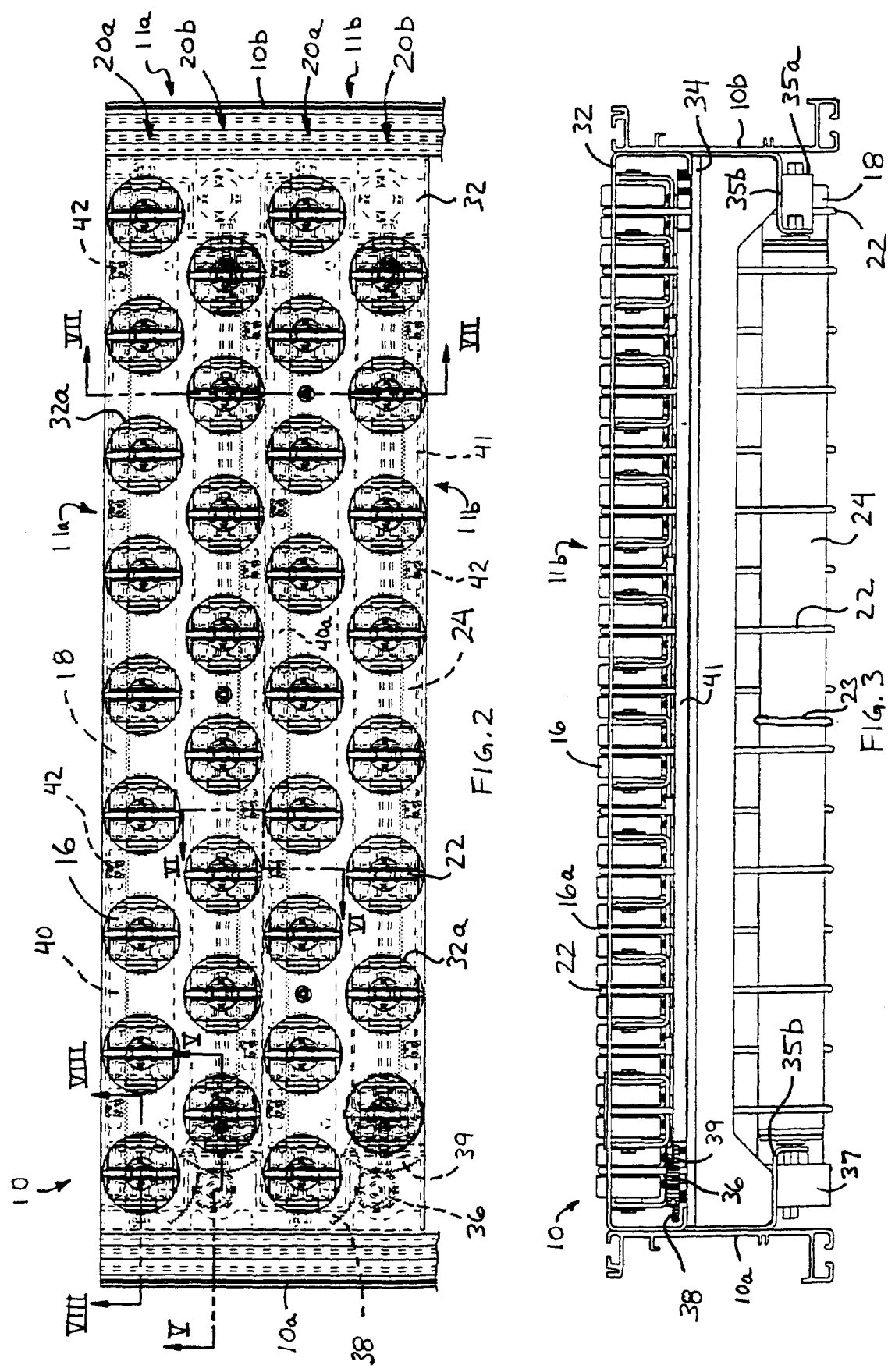

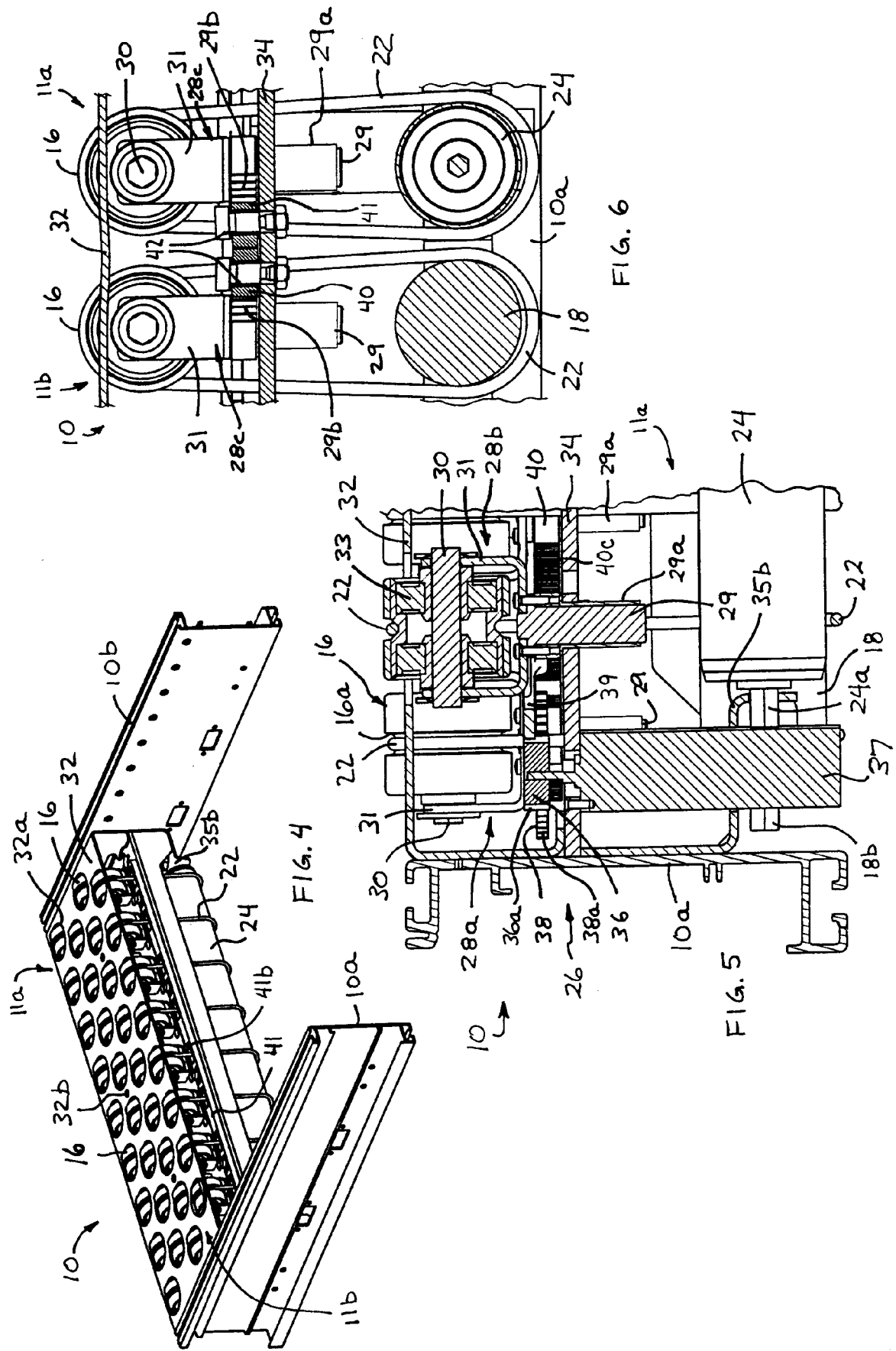

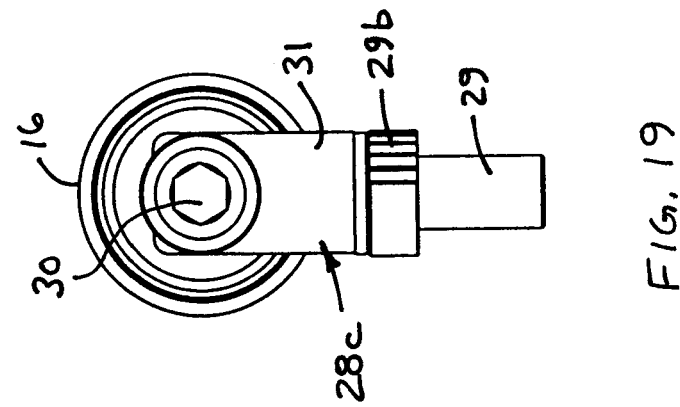
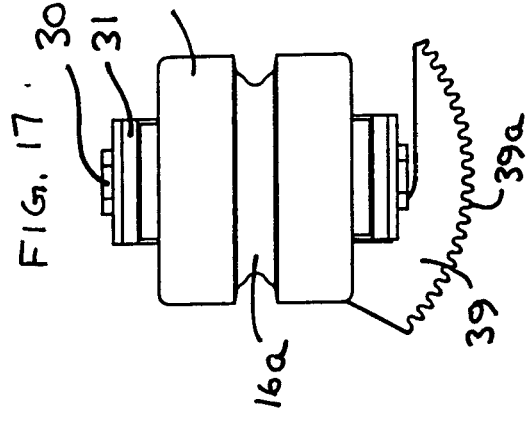
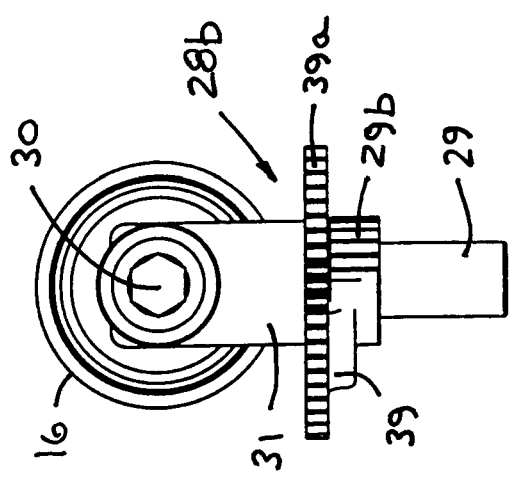
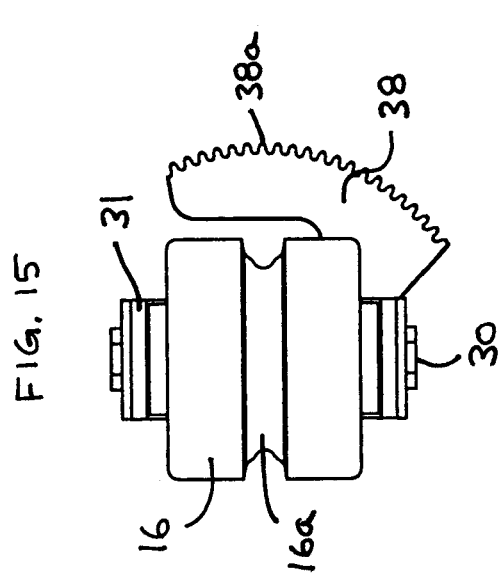
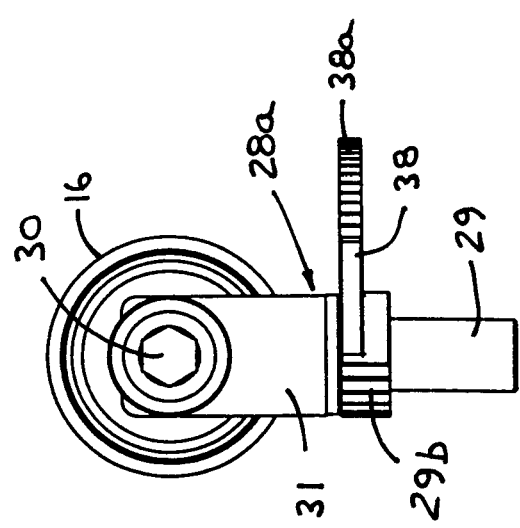

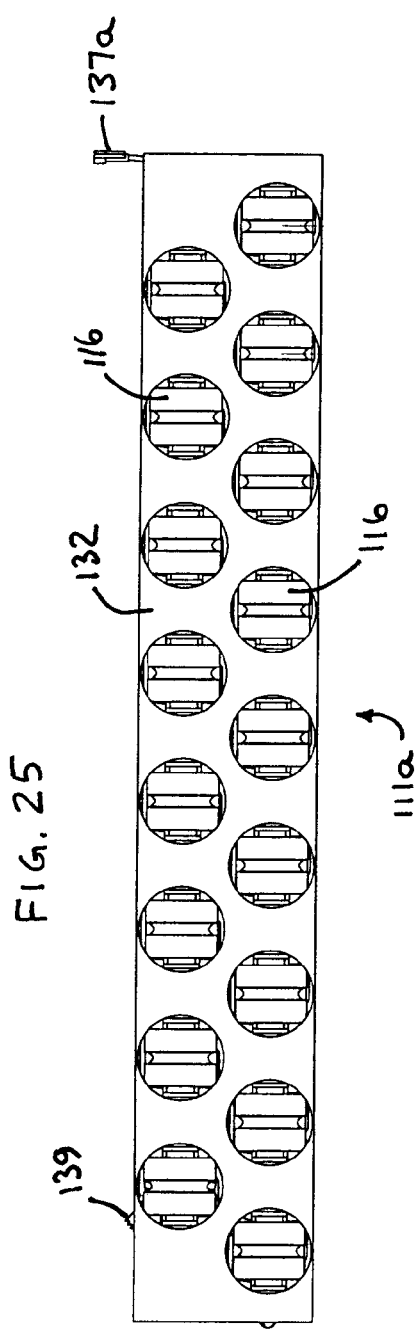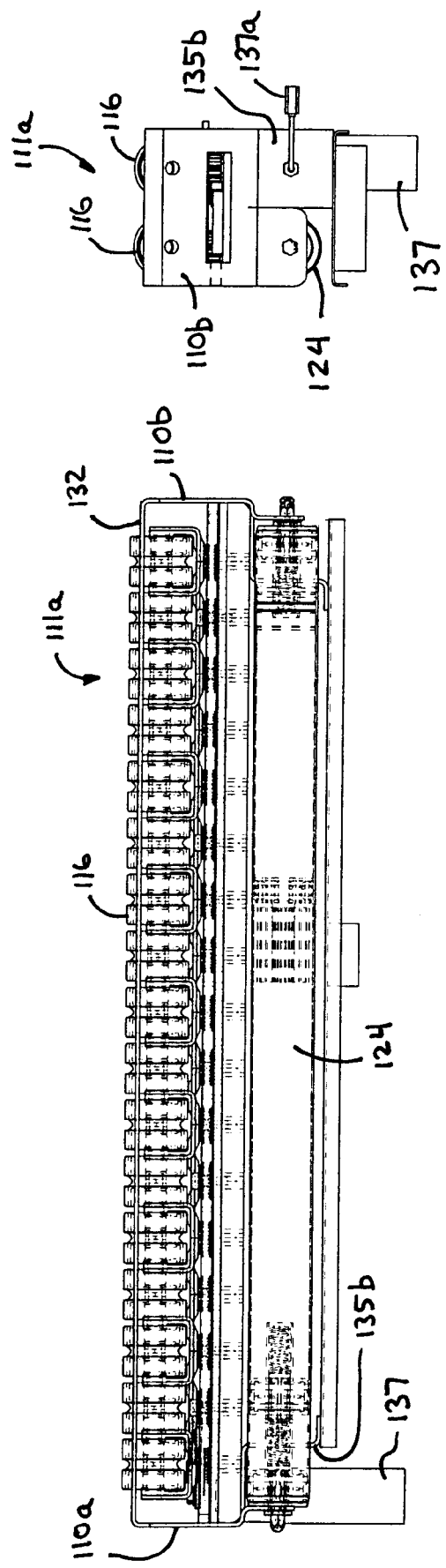

STEERABLE DIVERTER SYSTEM

CROSS REFERENCE TO RELATED APPLICATIONS

The present application claims benefit of U.S. provisional application, Ser. No. 60/492,493, filed Aug. 5, 2003, which is hereby incorporated herein by reference in its entirety.

FIELD OF INVENTION

The present invention relates generally to conveyors and, more particularly, to conveyors having diverters or diverter systems for steering or diverting articles conveyed along the conveyors.

BACKGROUND OF INVENTION

Diverters for conveyors are known and function to change the conveyance direction of or divert an article that is being conveyed along a conveyor. For example, a diverter may include a plurality of roller wheels that may be pivotable between a non-diverting orientation, with their axes of rotation being generally transverse to the direction of conveyance of the conveyor (such as, for example, generally parallel to the axes of rotation of the rollers of a roller conveyor) and a diverting orientation, where their axes of rotation are skewed, so that articles conveyed over the wheels are diverted at an angle with respect to the direction of conveyance of the conveyor.

An example of such a diverter is disclosed in U.S. Pat. No. 3,983,988, which is hereby incorporated herein by reference. Two rows of diverter wheels are rotatably driven via a drive motor positioned generally between and below the rows of diverter wheels. The diverter wheels of the rows are pivoted via a pneumatic cylinder and mechanical linkage system, whereby extension and retraction of the cylinder causes a corresponding movement of the linkages to pivot the wheels. The linkage arrangement causes a greater skew angle of the downstream row of wheels than the upstream row of wheels.

SUMMARY OF INVENTION

The present invention provides a diverter system that selectively diverts articles that are being conveyed along a conveyor, such as a roller conveyor or the like, in a different direction than the direction of conveyance of the conveyor. The diverter system may divert the articles to generally align the articles along one side of the conveyor or to move or discharge or divert the articles from the conveyor to another conveyor section that extends at an angle from the conveyor. The diverter system of the present invention includes a motorized roller positioned generally beneath a row of diverter wheels and operable to rotatably drive the diverter wheels via respective ones of a plurality of drive members or bands around the motorized roller and the diverter wheels. The diverter system may include an idler roller positioned generally beneath an adjacent row of diverter wheels, whereby the motorized roller may also rotatably drive the idler roller which, in turn, may rotatably drive the diverter wheels of the adjacent row via respective ones of a plurality of drive members or bands around the idler roller and the diverter wheels. The diverter system of the present invention may include a rack and pinion type steering system that may steer or pivot or rotate one or more rows of diverter wheels generally in unison in response to rotation or pivotal movement of a pinion or drive or spur gear.

According to an aspect of the present invention, a diverter system includes opposite sidewalls, a plurality of wheels arranged between the opposite sidewalls, and a motorized roller. The wheels are selectively pivotable about respective generally vertical axes to divert or steer articles being conveyed therealong. The motorized roller has an internal motor operable to rotate a roller portion of the motorized roller relative to a shaft portion of the motorized roller. The shaft portion of the motorized roller is generally fixed relative to the sidewalls. The motorized roller is positioned generally along the plurality of wheels and is operable to rotatably drive the plurality of wheels via a plurality of drive members reeved around the motorized roller and respective ones of the wheels.

The wheels may be pivotally mounted to a base plate positioned between the opposite sidewalls. The motorized roller may be positioned beneath the base plate, wherein the base plate includes a plurality of slots to receive the drive members therethrough.

The diverter system may have two rows of wheels that are rotatably driven by the motorized roller. The motorized roller may be positioned generally along one of the rows and an idler roller may be positioned generally along the other of the rows. The motorized roller may be operable to rotatably drive the idler roller and to rotatably drive the wheels of the one row, while the idler roller rotatably drives the wheels of the other row via a plurality of drive members reeved around the idler roller and respective ones of the wheels of the other row.

According to another aspect of the present invention, a diverter system includes opposite sidewalls, a plurality of wheels arranged in at least one row, and a steering system operable to selectively pivot the wheels about a generally vertical axis. The wheels are pivotally mounted to a base plate extending between the opposite sidewalls. The steering system includes a rotatable drive gear and at least one rack member extending at least partially along the row of wheels. Rotation of the drive gear causes a corresponding translational movement of the rack member and the corresponding translational movement of the rack member causes a corresponding pivotal movement of at least some of the wheels of the row of wheels.

Optionally, at least one of the wheels may include a gear plate that engages the drive gear. The wheel or wheels may include a drive portion or toothed portion that drivably engages the rack member. Rotation of the drive gear thus causes pivotal movement of one wheel and the pivotal movement of the one wheel causes the corresponding translational movement of the rack member. The other wheels may include gear portions which drivably engage a corresponding gear portion of the at least one rack member. Optionally, the diverter system may comprise two rows of wheels, wherein the wheels of the two rows of wheels are selectively steerable together via a pair of rack members extending along the respective rows.

Therefore, the present invention provides a diverter system that includes a plurality of diverter wheels that are rotatably driven by a motorized roller positioned beneath a row of diverter wheels. One or more rows of the diverter wheels are steerable or pivotable in response to pivotal movement of a pinion or drive gear that causes rotation of at least one of the diverter wheels which, in turn, causes translational movement of at least one track or rack member extending at least partially along the row or rows of diverter wheels. The translational movement of the rack or racks causes a corresponding rotational movement of the other diverter wheels of the row or rows of diverter wheels.

These and other objects, advantages, purposes and features of the present invention will become apparent upon review of the following specification in conjunction with the drawings.

BRIEF DESCRIPTION OF DRAWINGS

FIG. 1 is a plan view of a conveyor system having a diverter system in accordance with the present invention;

FIG. 2 is an enlarged plan view of the diverter system of FIG. 1;

FIG. 3 is an end elevation of the diverter system of FIG. 2;

FIG. 4 is a perspective view of the diverter system of FIGS. 2 and 3, as mounted between a pair of sidewalls or side channels;

FIG. 5 is a sectional view of the diverter system taken along the line V—V in FIG. 2;

FIG. 6 is another sectional view of the diverter system taken along the line VI—VI in FIG. 2;

FIG. 15 is a plan view of a wheel assembly suitable for use with the steering system of the diverter system of the present invention;

FIG. 16 is a side elevation of the wheel assembly of FIG. 15;

FIG. 17 is a plan view of another wheel assembly suitable for use with the steering system of the diverter system of the present invention;

FIG. 18 is a side elevation of the wheel assembly of FIG. 17;

FIG. 19 is a side elevation of another wheel assembly suitable for use with the steering system of the diverter system of the present invention;

FIG. 24 is an end elevation of a diverter system module of the diverter system of FIG. 23;

FIG. 25 is a plan view of the diverter system module of FIG. 24; and

FIG. 26 is a side elevation of the diverter system module of FIGS. 24 and 25.

DETAILED DESCRIPTION

Figure 7:
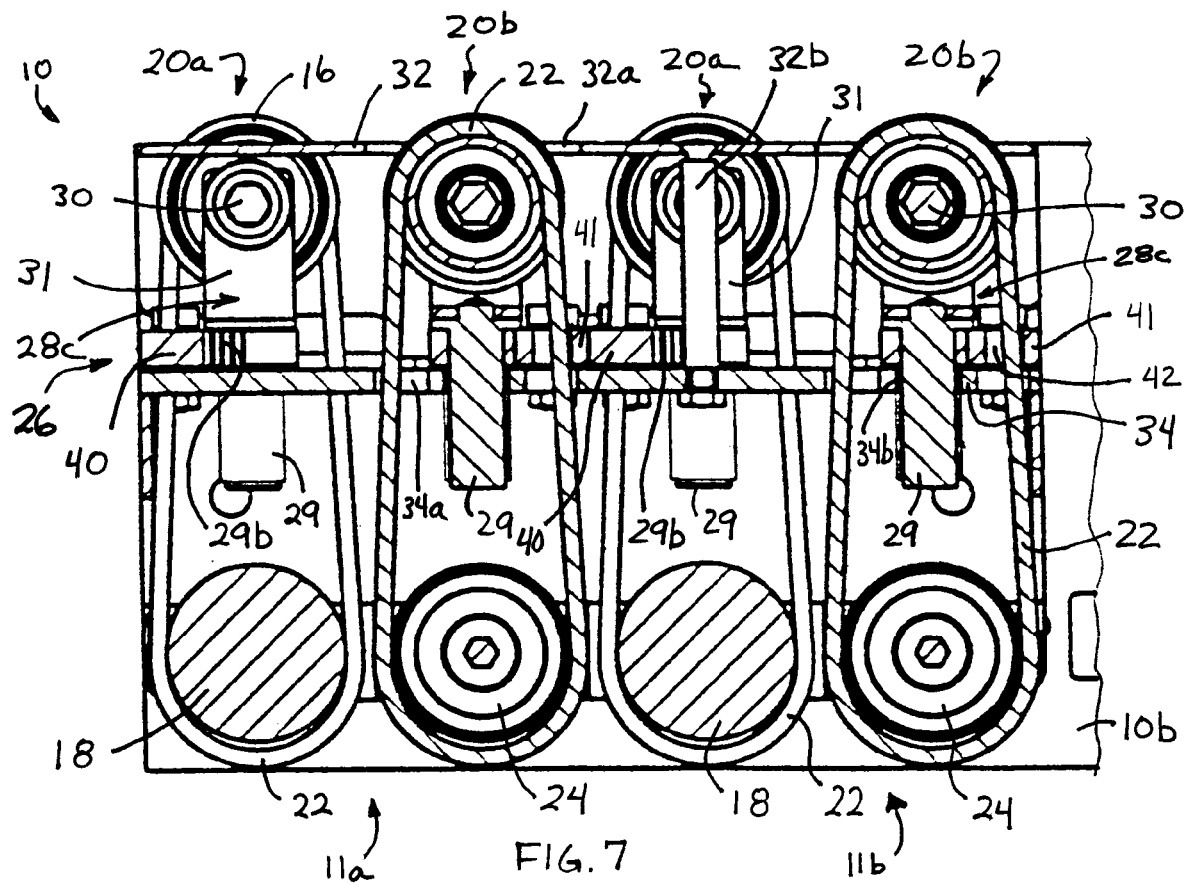
FIG. 7 is another sectional view of the diverter system taken along the line VII—VII in FIG. 2.
Figure 8:
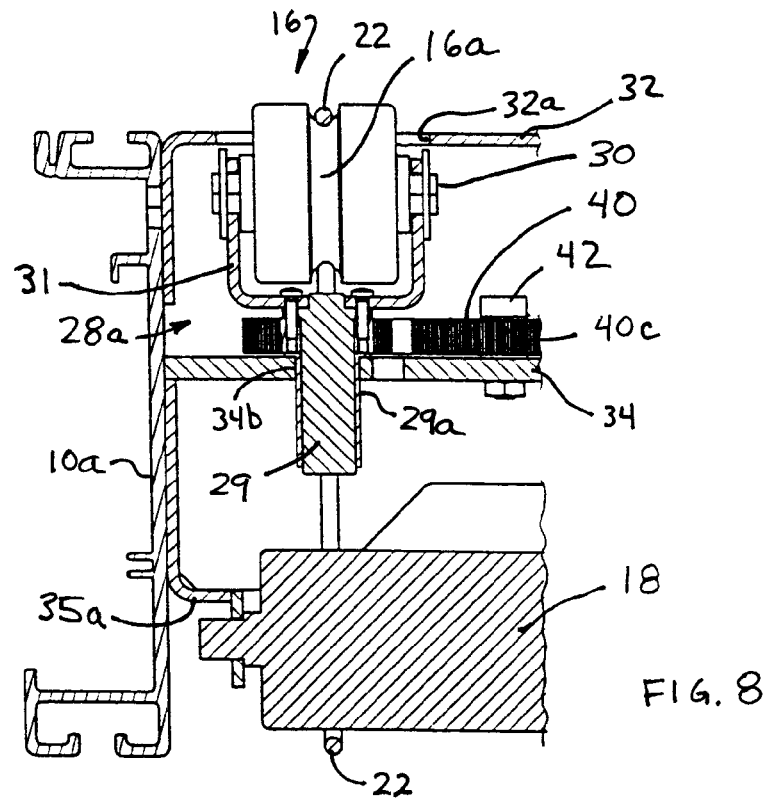
FIG. 8 is another sectional view of the diverter system taken along the line VIII—VIII in FIG. 2.

Referring now to the drawings and the illustrative embodiments depicted therein, a diverter system 10 is positionable at or along a conveyor or conveyor section 12 and is operable to divert articles that are conveyed along conveyor section 12 toward one side of the conveyor section or toward and onto another conveyor section 14 (such as an angled conveyor section or the like) adjacent to the primary conveyor section 12 (FIG. 1). The diverter system 10 includes one or more diverter units 11a, 11b, each of which includes a plurality of diverter wheels 16 that are rotatably driven by a motorized roller 18 (FIGS. 2, 3 and 5–8) positioned generally beneath the wheels 16 and between the sidewalls 10a, 10b of the diverter system 10. The diverter wheels 16 of each diverter unit 11a, 11b are arranged in rows 20a, 20b extending at least partially between the sidewalls 10a, 10b of diverter system 10. The diverter wheels 16 of the respective rows 20a, 20b are rotatably driven via a plurality of drive members or O-rings or bands 22 wrapped or reeved around the diverter wheels and the motorized roller 18 or an idler roller 24 positioned generally along and adjacent to motorized roller 18 and rotatably driven by motorized roller 18, as discussed below. The wheels 16 of one or more rows 20a, 20b may be pivotable or steerable together in response to a steering system 26, as also discussed below. As shown in FIGS. 1, 2, 4, 6 and 7, two or more diverter units 11a, 11b may be positioned adjacent to one another to define a diverter system or section of diverter units. However, the number of diverter units placed along a conveyor section may vary depending on the particular application of the diverter system of the present invention, and more or less diverter units may be implemented in or along a conveyor section or between conveyor sections, without affecting the scope of the present invention.

The conveyor sections 12, 12c may comprise any type of conveyor section, such as, for example, a motorized roller conveyor having a plurality of rollers 12a positioned between opposite sidewalls 12b and rotatable to convey articles along the conveyor section or sections. The other conveyor section 14 may extend at an angle from the diverter system or from a downstream conveyor section 12c. The angled conveyor section 14 may include an angled belt conveyor or may include a plurality of different width rollers arranged to define the angled conveyor section adjacent to a sidewall of the primary conveyor section 12.

As shown in FIGS. 3–8, the upper portions of the diverter wheels 16 of diverter system 10 protrude above an upper cover plate 32 that extends generally between the sidewalls 10a, 10b of diverter system 10 and that may span one or more diverter units. As shown in FIGS. 2 and 4, the cover plate 32 may include a plurality of generally circular holes or apertures 32a for receiving the upper portions of the wheels 16 therethrough such that the wheels define a conveying surface above the cover plate, while the cover plate prevents articles from falling between the wheels or otherwise becoming stuck or lodged between the wheels of the diverter system. The cover plate may include support posts or fasteners or the like 32b (FIGS. 2, 4 and 7) for supporting the cover plate at areas between the sidewalls 10a, 10b of diverter system 10. The diverter wheels may be pivotable to steer or divert articles without contacting the edges of the cover plate 32 around the holes 32a. The wheels are positioned such that the upper portions of the wheels protrude above the cover plate, such that the diverter system of the present invention does not have to raise or "pop-up" the wheels to divert articles along the diverter system.

Each of the diverter wheels 16 is rotatably mounted to a yoke or mounting assembly 28 and is rotatable about a generally horizontal axis defined by an axle or pin 30 that rotatably mounts the wheels 16 between a pair of upwardly extending supports 31 of mounting assembly 28. The axle 30 and/or the diverter wheel 16 may include a bearing or bushing 33 (FIG. 5) to facilitate or enhance rotation of the wheel 16 about the axle 30. The axle 30 may have a hexagonal-shaped cross section or other shape, without affecting the scope of the present invention.

Each of the mounting assemblies 28 is pivotally mounted to a base plate or base weldment 34 via a generally vertically oriented pivot pin or shaft 29 pivotally received within a respective opening or aperture 34b (FIG. 8) in weldment 34. The base weldment 34 also includes a plurality of slots 34a (FIGS. 7, 11, 12 and 14) for receiving the bands or drive members 22 therethrough and to facilitate pivotal movement of the wheels 16 without having the bands interfere with or contact the edges of the base weldment around the slots 34a. Base weldment 34 extends generally across the diverter system and between the sidewalls 10a, 10b of diverter system 10. The pivot pin 29 or weldment openings 34b may include a bearing or bushing 29a to facilitate pivotal movement of pivot pin 29 and thus of mounting assembly 28 about a generally vertical axis relative to weldment 34. The mounting assemblies 28 thus may be pivotally moved or steered to change the direction of conveyance of an article being conveyed along the diverter system 10, as discussed below.

Motorized or powered or self-driven roller 18 may be positioned generally along and beneath one of the rows 20a of a diverter unit 11a, 11b. The motorized roller 18 may rotatably drive each of the diverter wheels 16 of one row 20a of diverter unit 11a, 11b via a respective band or drive member 22. Motorized roller 18 may also rotatably drive an idler roller 24 via another band or O-ring or drive member 23 (FIG. 3), while idler roller 24 may, in turn, rotatably drive each of the wheels 16 of the other row 20b of diverter unit 11a, 11b via a respective band or drive member 22. The diverter wheels 16 of each diverter unit 11a, 11b thus may be rotatably driven by a motorized or powered roller 18. As best seen in FIGS. 5, 8, 15 and 17, each of the diverter wheels 16 of diverter system 10 has a groove 16a therearound to receive the drive member or band 22, such that the band does not protrude above the conveying surface defined by the wheels 16.

Motorized or powered or driven roller 18 may comprise a motorized or self-driven roller with an internal motor that is operable to rotate a roller portion 18a of the motorized roller relative to a shaft portion or axle portion 18b or mounting portion of the motorized roller. The axle portion 18b at each mounting end of the motorized roller 18 may be mounted to a mounting bracket or mounting member 35a, which may mount to the sidewalls 10a, 10b or base weldment 34 of diverter system 10, such that motorized roller 18 is positioned between the sidewalls 10a, 10b of the diverter system 10.

For example, motorized roller 18 may be of the type commercially available from various sources, such as a 12-volt DC or 24-volt DC motorized roller or the like. Optionally, the motorized roller may comprise a DC motorized roller, such as a 12-volt DC motorized roller or the like, such as a roller of the type disclosed in U.S. Pat. No. 6,244,427, the disclosure of which is hereby incorporated herein by reference. Optionally, the motorized roller may comprise a 24-volt DC motorized roller or a 42-volt DC motorized roller or a 48-volt DC motorized roller or the like. For example, the motorized roller may comprise a 48-volt DC motorized roller having a diameter of approximately 50 mm and an overall width of between 450 mm and 900 mm, or any other desired width to at least substantially span the gap between the sidewalls. The 48-volt DC motorized roller may comprise a DC brushless motor and may, for example, be operable at speeds between approximately 130 rpm and 1,150 rpm, and may provide an output of approximately 3 Nm of torque at approximately 400 rpm and approximately 1.5 Nm of torque at approximately 1,150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller portion directly, such as disclosed in U.S. Pat. No. 6,244,427, or may drive the roller via a gear train or the like, such as disclosed in U.S. Pat. No. 5,442,248, the disclosures of which are hereby incorporated herein by reference.

The idler roller 24 of diverter unit 11a, 11b may be a conventional, freely rotating roller, such as the type commercially available from various sources. The shaft or shaft portions 24a of the idler roller may be mounted to a respective end bracket 35b that is in turn mounted to the sidewalls 10a, 10b or base weldment 34 of diverter system 10. In the illustrated embodiment, the brackets 35b may extend laterally inward from the sidewalls 10a, 10b to accommodate an idler roller 24 that may be shorter in width than the motorized roller 18. For example, the motorized roller 18 may have an overall width of approximately 777 mm, while the idler roller 24 may have an overall width of approximately 694 mm, although other sized rollers may be implemented, without affecting the scope of the present invention.

The motorized roller 18 thus may be positioned along the row 20a of wheels 16 that has more wheels than the other row 20b, such that the outer wheels of row 20a are positioned laterally outwardly from the outer wheels of row 20b. The motorized roller 18 thus may drive more of the wheels 16 independently via the bands 22 around the motorized roller and the wheels, while the shorter idler roller 24 may drive fewer wheels 16 via bands 22. Clearly, the width of the motorized roller and/or idler roller is a design choice and depends on the particular application of the diverter system. Optionally, the motorized roller may be positioned at either row, or a motorized roller may be positioned at each row, or each row may include the same number of wheels or the like, without affecting the scope of the present invention.

Accordingly, when motorized or self-driven roller 18 is activated, the roller portion 18a of the self-driven roller is directly rotated or driven relative to its shaft portion 18b. Rotation of the roller portion 18a of motorized roller 18 drives the drive members 22 to move around the motorized roller 18 and to independently and separately or individually rotatably drive each of the diverter wheels 16 of row 20a that may be positioned generally above and along the motorized roller 18. The other drive member or drive members 23 wrapped or reeved around motorized roller 18 and idler roller 24 also rotatably drive idler roller 24 to rotate the roller portion of the idler roller about its axle portion or portions. The rotation of idler roller 24 likewise rotatably drives the wheels 16 of row 20b that may be positioned generally above and along the idler roller 24.

The steering system 26 of each diverter unit 11a, 11b is operable to steer or pivot all of the diverter wheels 16 of the respective diverter unit in unison to steer or divert an article being conveyed along the conveyor section and the diverter system 10. For example, the steering system 26 may steer the diverter wheels 16 of rows 20a and 20b of diverter unit 11a or 11b together, such that the diverter wheels 16 of both rows 20a, 20b are pivoted or turned substantially the same amount. In the illustrated embodiment, steering system 26 comprises a rack and pinion type of steering system and includes a rotatable drive gear or pinion or spur gear 36

(which may be rotatably driven via a rotational motor 37 or the like) that includes a plurality of teeth 36*a* for engaging the teeth 38*a*, 39*a* of a corresponding gear section or arcuate plate 38, 39 (FIGS. 5, 9, 13 and 15–18).

Figure 9:
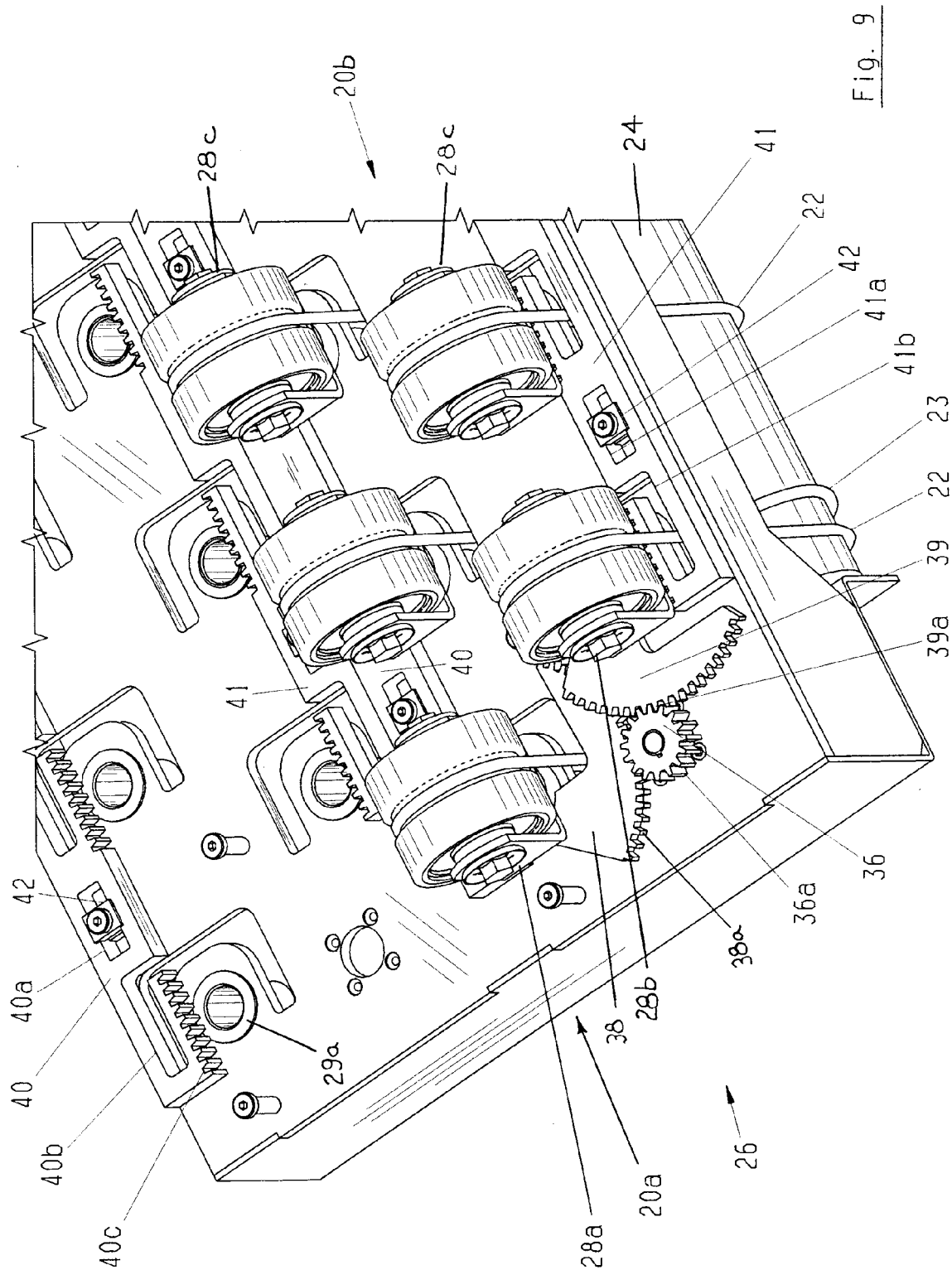
FIG. 9 is an enlarged perspective view of a drive gear and wheels of the diverter system of the present invention.
Figure 10:
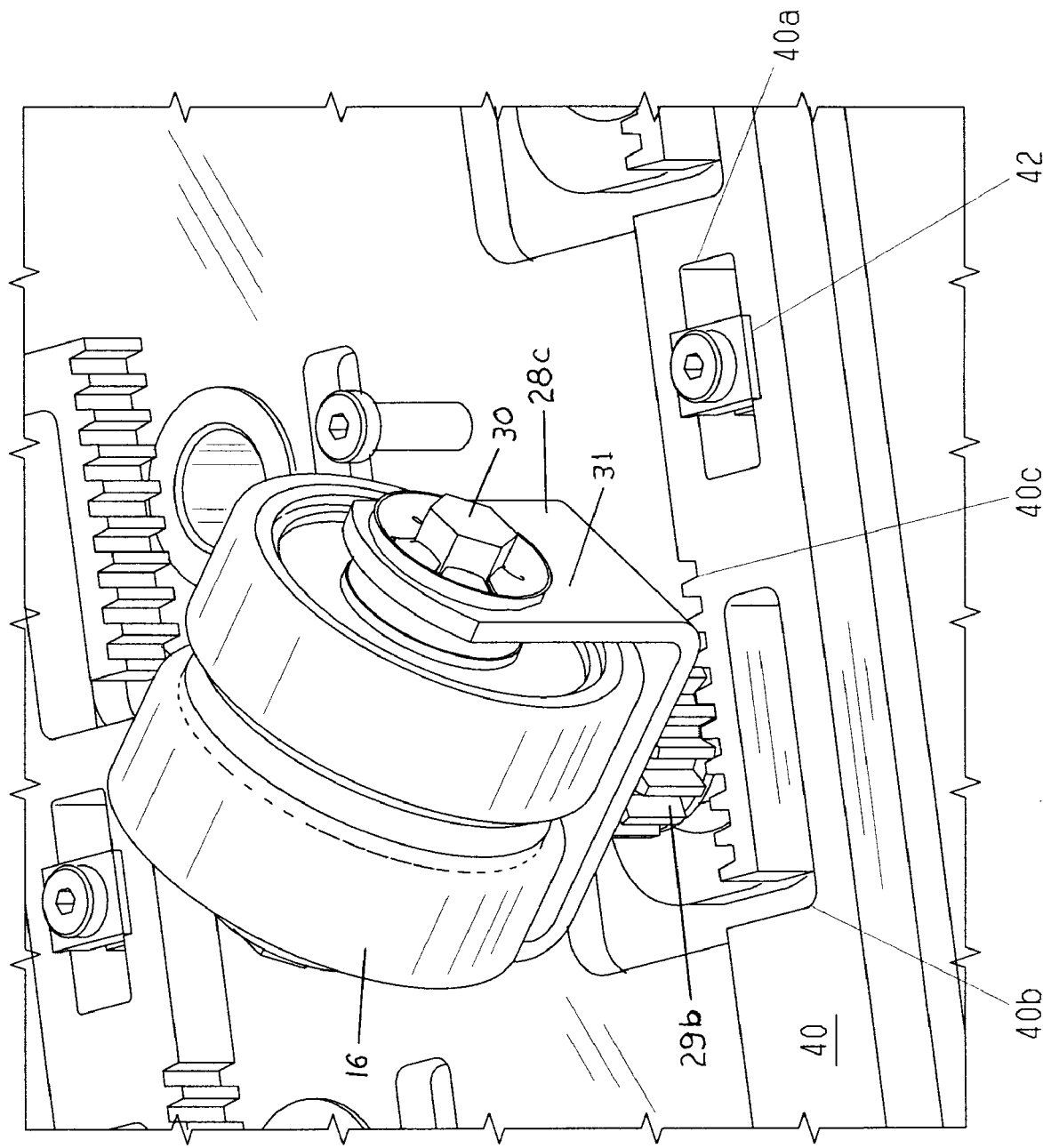
FIGS. 10–14 are enlarged perspective views of the rack and pinion steering system of the diverter system of the present invention.
Figure 11:
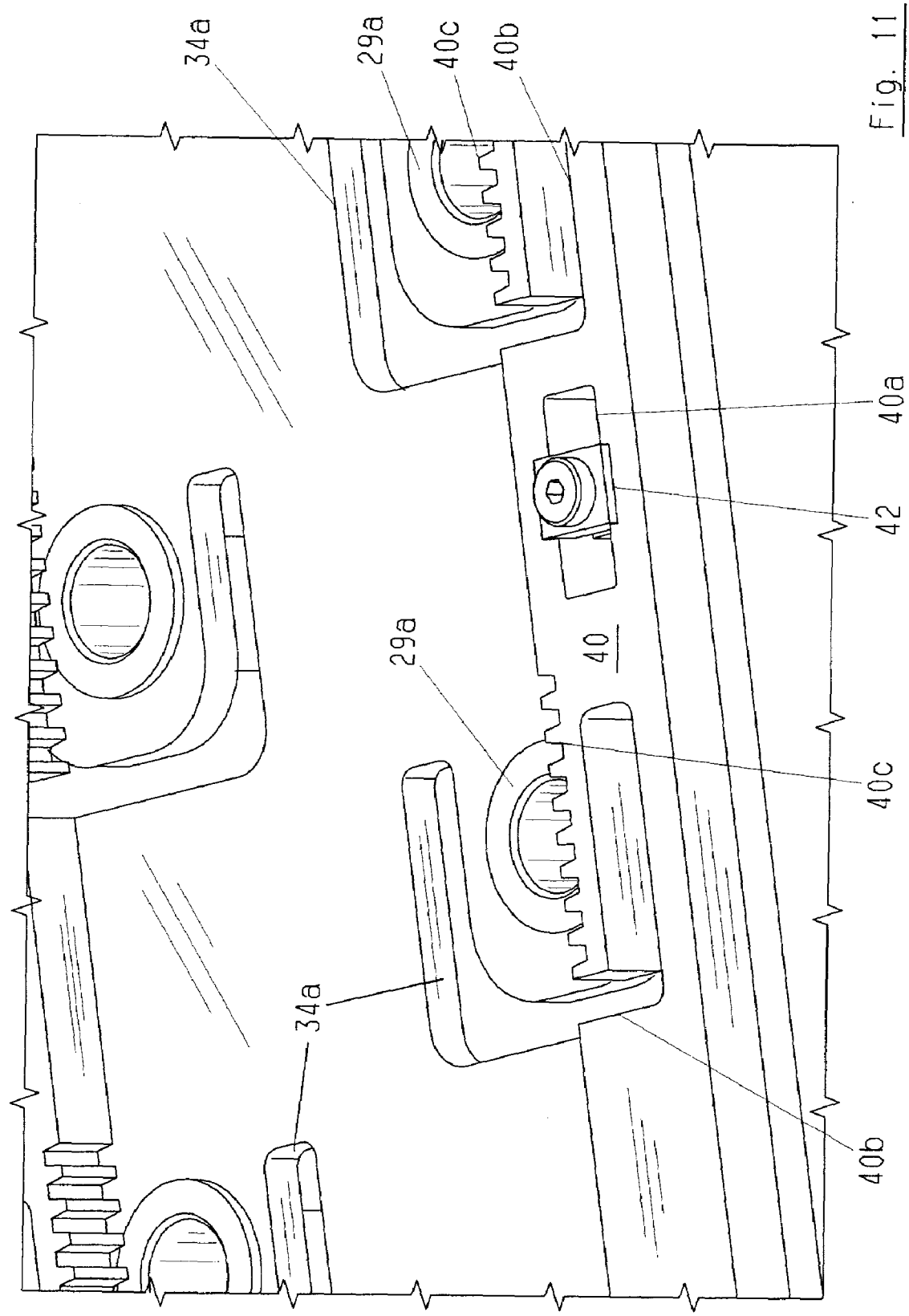
Figure 12:
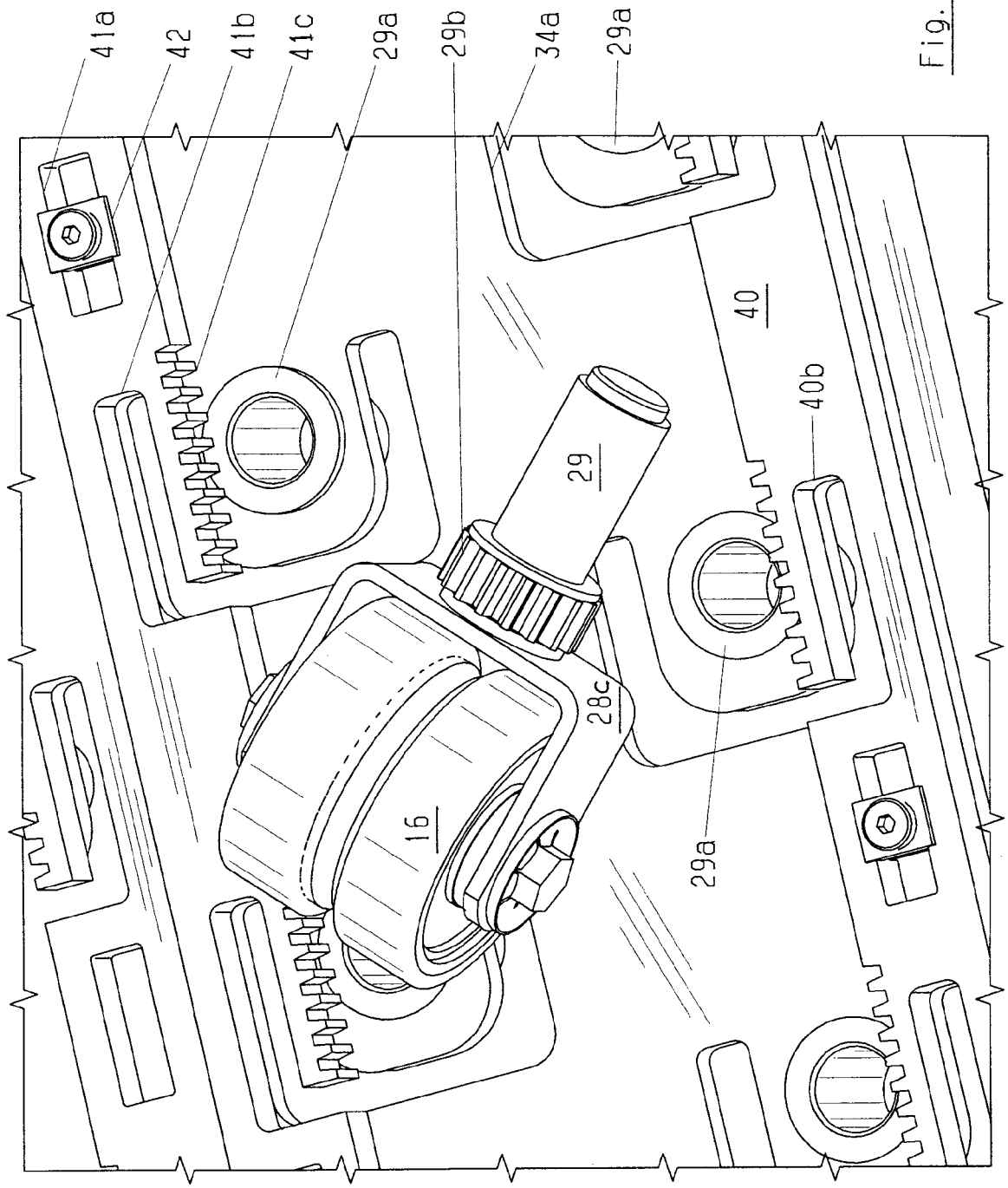
Figure 13:
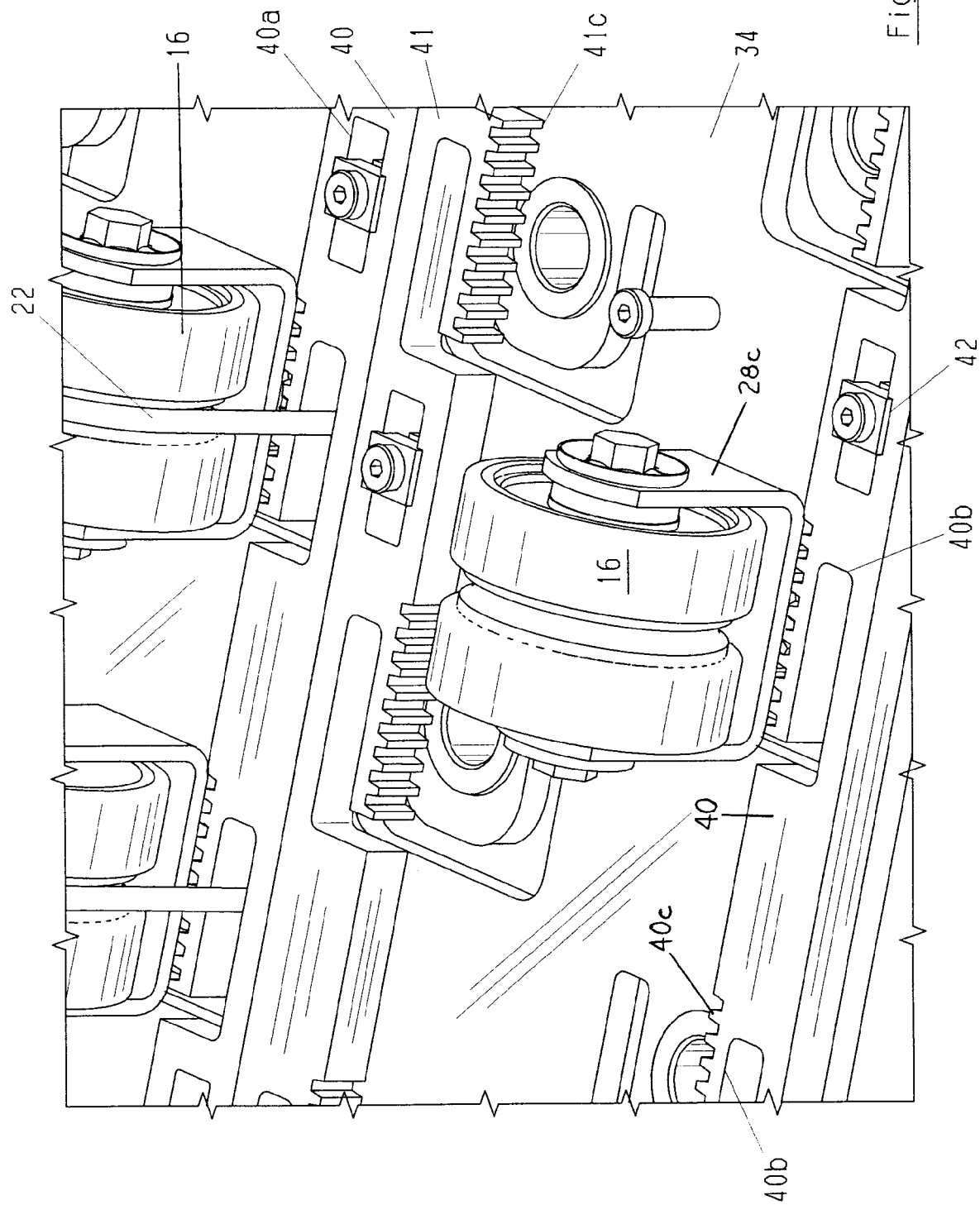
Figure 14:
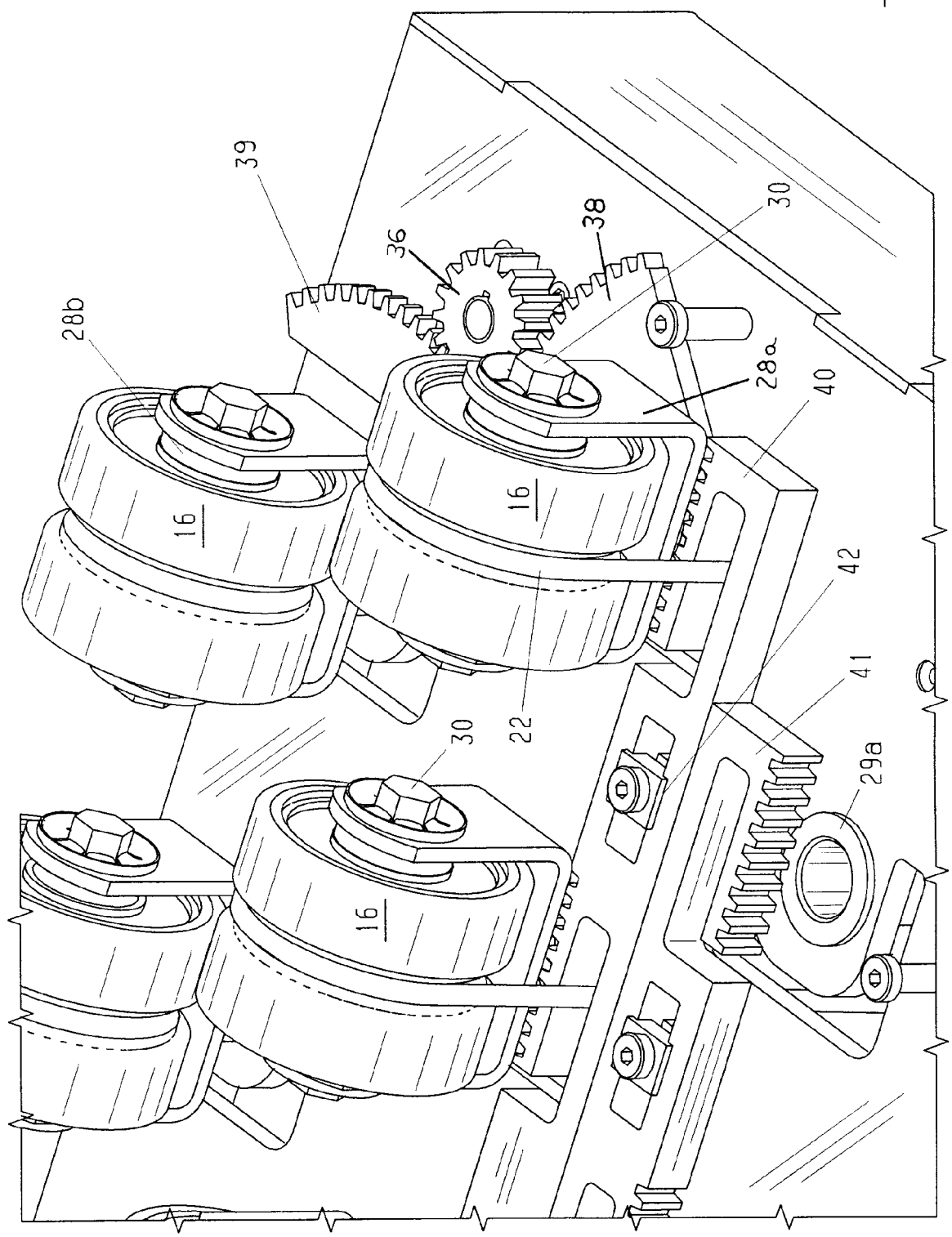

Gear sections or plates 38, 39 are fixedly mounted or attached to the respective mounting assembly 28*a*, 28*b*, such that pivotal movement of the spur gear 36 causes a pivotal movement of the plates 38, 39 via engagement of teeth 36*a* and teeth 38*a*, 39*a* of plates 38, 39, which in turn causes a pivotal movement of the mounting assemblies 28*a*, 28*b* and thus of the respective diverter wheels 16. For example, and as shown in FIGS. 5, 9, 13, 15 and 16, plate 38 is fixedly mounted to mounting assembly 28*a* at the end of row 20*a* of wheels 16, while plate 39 is fixedly mounted to mounting assembly 28*b* at the end of row 20*b* of wheels 16. As can be seen in FIGS. 5 and 9, plate 39 is formed so that it is positioned generally above plate 38, so that the plates 38, 39 do not contact or interfere with one another during operation of the steering system 26. The plates 38, 39 engage the spur gear 36, such that rotation of the spur gear 36 causes rotation of the wheel mounting assemblies 28*a*, 28*b*, which in turn cause rotation of the other wheel mounting assemblies 38*c* and wheels 16 via a pair of track or rack members 40, 41.

As shown in FIGS. 15–18, wheel mounting assembly 28*a*, 28*b* includes the respective plate or collar 38, 39 around its shaft or pivot pin 29, with the plate extending in the desired direction from the pivot pin to provide the desired orientation of the diverter wheels relative to the conveyor and to one another. As can be seen in FIGS. 15–18, the plates 38, 39 extend in different directions from the shafts or pins 29 relative to the orientation of the wheel on the shaft or pin. The mounting assemblies 28*a*, 28*b* also include a toothed collar or toothed portion or gear portion 29*b* around the shaft of the pin 29, while the other mounting assemblies 28*c* (FIGS. 9, 10, 12–14 and 19) of the diverter units also include a toothed collar or toothed portion or gear portion 29*b* around the shaft or pin 29 with a plurality of teeth at least partially around the collar for engaging corresponding teeth of the track members 40, 41, as discussed below. Optionally, the toothed collars 29*b* of mounting assemblies 28*a*, 28*b* may be integrally formed with the plates 38, 39, such as shown in FIGS. 16 and 18.

Steering system 26 also includes the pair of track members or rack members 40, 41, which are movably or slidably mounted to base weldment 34 and which move generally along the rows 20*a*, 20*b*, respectively. Rack members 40, 41 are movable back and forth along the rows and are slidably mounted and guided by a plurality of guide members 42 that extend through slots 40*a*, 41*a* in the rack members 40, 41 to secure the rack members to the base weldment 34. The guide members 42 may comprise plastic or polymeric guide members secured to the weldment to facilitate sliding movement of the rack members relative to the guide members. The rack members 40, 41 include slots 40*b*, 41*b* (FIGS. 4 and 7) therethrough to receive the bands 22 and to facilitate translational movement of the rack members 40, 41 relative to the diverter wheels 16 and bands 22 and the corresponding pivotal movement of the wheels 16 and bands 22, without having the rack members 40, 41 interfere with or contact the bands 22 during operation of the diverter system 10.

The toothed portion or gear portion or collar 29*b* of each pivot pin 29 engages a corresponding toothed portion or gear portion 40*c*, 41*c* of the respective rack member 40, 41. Sliding or translational movement of the rack member 40, 41 thus causes a corresponding pivotal movement of the mounting assemblies 28 and diverter wheels 16 to turn or steer the wheels of the diverter unit 11*a*, 11*b*.

Accordingly, when the spur gear 36 of one of the diverter units 11*a*, 11*b* is pivoted or driven or rotated (such as via a rotational drive motor 37 or the like), the arcuate plates 38, 39 of mounting assemblies 28*a*, 28*b* are pivoted about their axes which causes a corresponding pivotal movement of the mounting assemblies 28*a*, 28*b* and their respective diverter wheels 16. As the mounting assemblies 28*a*, 28*b* are pivoted about their vertical axes, the toothed portions 29*b* of pivot pins 29 of mounting assemblies 28*a*, 28*b* (which are engaged with the corresponding toothed portions 40*c*, 41*c* of rack members 40, 41) pivot, which causes a translational or sliding movement of the respective rack member 40, 41. Likewise, as the rack members 40, 41 are moved or slid, the toothed portions 40*c*, 41*c* of rack members 40, 41 engage and pivot the toothed portions 29*b* of the other mounting assemblies 28*c* to cause a corresponding pivotal movement of the other pivot pins 29 and mounting assemblies 28*c* and diverter wheels 16 along the respective row 20*a*, 20*b* of diverter wheels 16.

All of the diverter wheels 16 of both rows 20*a*, 20*b* thus may be steered in unison via rotational driving of a single drive gear or spur gear, such as at an end of one of the rows (although the drive gear or spur-gear may be positioned elsewhere along the rows, without affecting the scope of the present invention). The steering system 26 of each diverter unit 11*a*, 11*b* may be operable independently of the steering system 26 of another diverter unit 11*a*, 11*b*. As can be seen in FIG. 6, the rack member 41 of one diverter unit 11*a* may be positioned generally along and adjacent to the rack member 40 of another or downstream diverter unit 11*b*.

Figure 21:
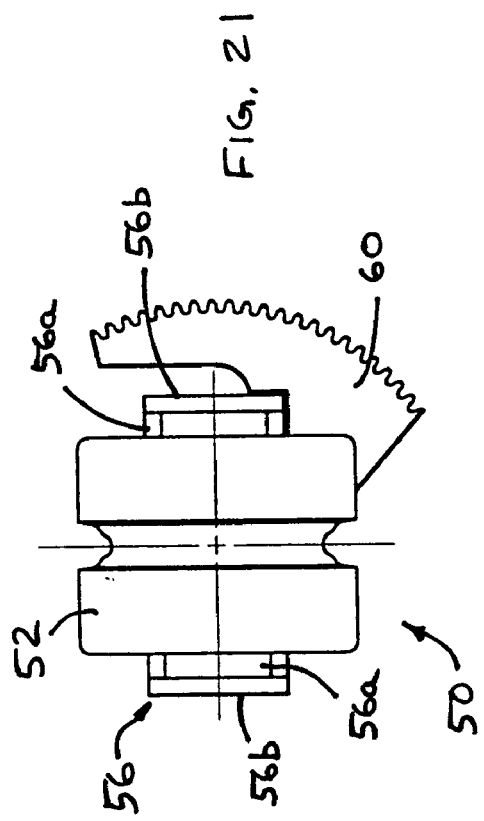
FIG. 21 is a plan view of the diverter wheel of FIG. 20.
Figure 20:
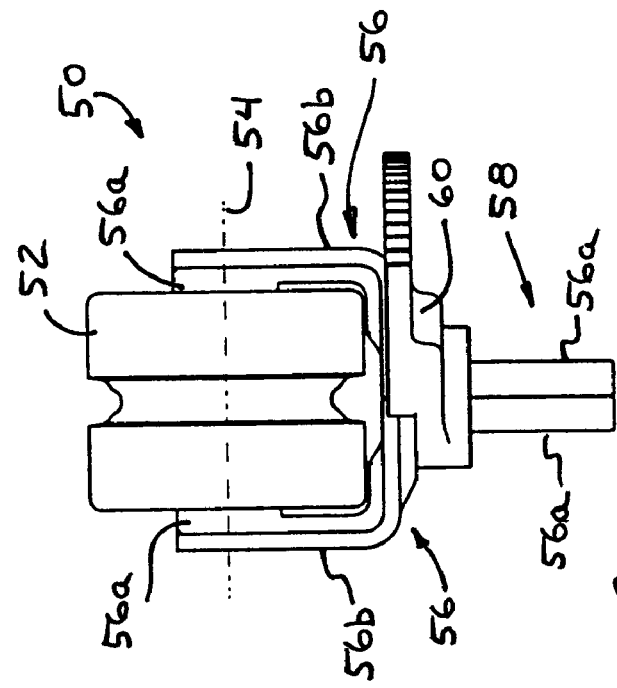
FIG. 20 is a side elevation of a diverter wheel useful with the present invention.
Figure 22:
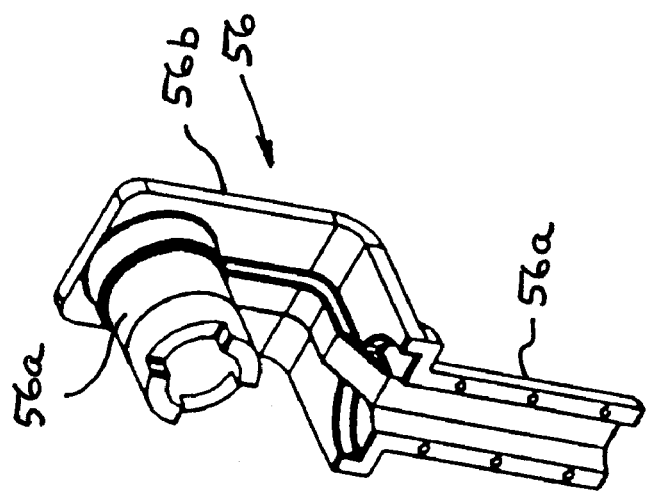
FIG. 22 is a perspective view of a side piece that is suitable to mount the diverter wheel to the diverter system of the present invention.

Optionally, and with reference to FIGS. 20–22, a diverter wheel assembly 50 may comprise a wheel portion 52, which includes a bearing or bushing (not shown) generally along the rotational axis 54 of wheel portion 52. A pair of side mounting portions 56 are assembled together to rotatably mount the wheel portion 52 thereto. Each side mounting portion 56 (one shown in FIG. 22, of which two may be assembled together to form the mounting assembly) includes a shaft portion 56*a* and a mounting arm 56*b* extending upward from a shaft portion 56*c*. The shaft portions 56*a* may be inserted into opposite ends of the bearing or bushing within wheel portion 52 and the shaft portions 56*c* may be snapped or joined together or engaged to form the pivot pin 58 of the wheel assembly 50. As can be seen in FIGS. 20 and 21, a toothed plate or collar 60 may receive the assembled shaft portions or pivot pin 58 therethrough and may function to limit or substantially preclude separation of the shaft portions to hold the pivot pin together. The diverter wheel assembly 50 thus may comprise only a few components and may include common side mounting portions, and thus may provide a low cost and easy to assembly wheel assembly.

Optionally, and with reference to FIGS. 23–26, a diverter 110 is positionable at or along a conveyor or conveyor section 112 and is operable to divert articles that are conveyed along the conveyor section 112 toward one side of the conveyor section or toward and onto another conveyor section 114 (such as an angled conveyor section or the like) adjacent to the primary conveyor section 112. The diverter system 110 includes one or more diverter units 111*a*, 111*b*, each of which includes a plurality of diverter wheels 116 that are rotatably driven by a motorized roller 118 positioned generally beneath the wheels 116 and between the sidewalls 110*a*, 110*b* of the diverter system 110. The diverter system 110 may be substantially similar in operation to diverter system 10, discussed above, such that a detailed description of the diverter systems will not be repeated herein. The components or features of diverter system 110 are shown in FIGS. 23–26 with the same reference numbers as shown with respect to diverter system 10, with 100 added to each number shown. As can be seen with reference to FIGS. 23, 24 and 26, the motorized roller 118 of diverter system 110 may be shorter than the idler roller 124 to provide clearance for the wiring or lead 137a to route from the end of the motorized roller 118 and between the roller bracket 135b and the sidewall 112b of the conveyor when the diverter unit 111a is mounted at the conveyor sidewalls 112b.

Figure 23:
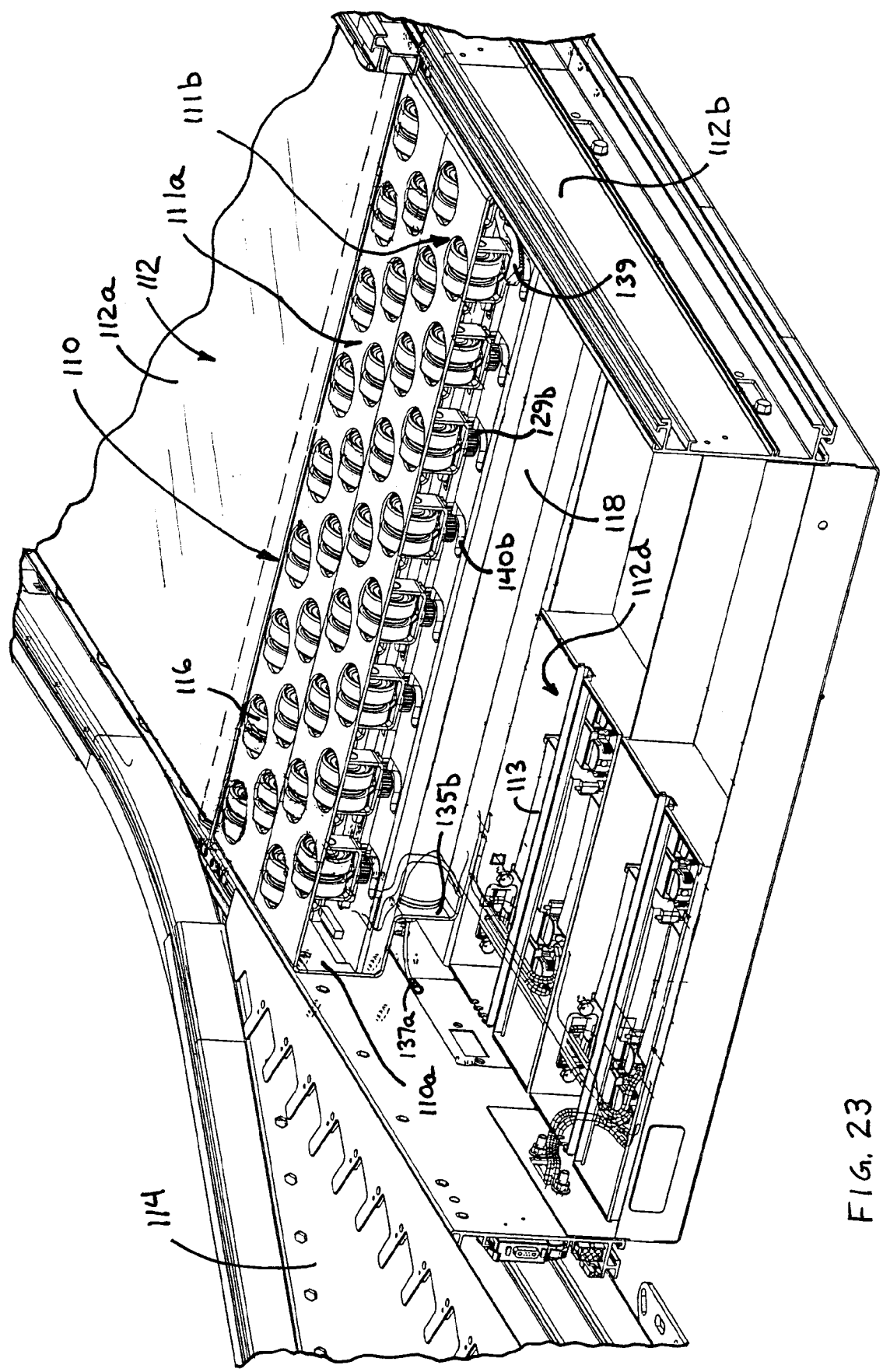
FIG. 23 is a perspective view of a diverter system in accordance with the present invention.

Diverter units 111a, 111b are generally modular units with side walls 110a, 110b that mount to the sidewalls or side channels 112b of conveyor section 112. The diverter units 111a, 111b thus may be readily installed between the sidewalls of the conveyor section and may be readily removed for service or maintenance or repair or replacement or the like. As shown in FIG. 23, the lower portion of the conveyor section 112 (which may be a belt conveyor with an endless belt 112a driven around pulleys or rollers, such as is known in the conveyor arts) may include a control support 112d extending between the sidewalls 112b for supporting and housing or containing the electronic controls 113 of the conveyor section and/or of the diverter unit or units. The diverter units thus may be positioned at or generally over the respective controls and may readily connect to the controls before being lowered fully into place overtop of the controls. For example, the leads or wires to the motorized roller 118 and the steering motor 137 may be connected to the appropriate control or power source as the diverter unit is lowered into place between the sidewalls of the conveyor section. Optionally, a single connector or plug/socket 137a may be provided at the diverter unit so that the electrical connection to the motors of the diverter unit are made via connection of the connector to a corresponding connector at the control or power source housed or contained within the control support 112d. The diverter unit thus may be quickly and easily installed into and removed from the conveyor section as a unit.

Although shown as comprising metal gears and rack members and pivot pins, it is envisioned that the gears and rack members and pivot pins, or the teeth of the gears and rack members and pivot pins, may be formed of other suitable materials, such as plastic or polymeric materials or the like, without affecting the scope of the present invention. Alternately, it is further envisioned that the gears and rack members and pivot pins may otherwise drivably engage one another, such as via frictional engagement or the like, without affecting the scope of the present invention.

Therefore, the diverter system of the present invention is operable to convey and divert articles that are being conveyed along a conveyor section and along the diverter system. The diverter system may convey and divert the articles in response to a motorized roller positioned at or adjacent to one or more rows of wheels of the diverter system and drivably connected to the wheels. The wheels may be pivoted about respective generally vertical axes or steered to divert articles toward one side of the diverter system or the other or to divert articles onto an adjacent conveyor section. The wheels may be steered via a rack and pinion type mechanism which steers the wheels of a diverter unit in response to rotation of a drive gear or spur gear.

Changes and modifications in the specifically described embodiments may be carried out without departing from the principles of the present invention, which is intended to be limited only by the scope of the appended claims as interpreted according to the principles of patent law.

The embodiments of the present invention in which an exclusive property or privilege is claimed are defined as follows:

The invention claimed is:

1. A diverter system comprising:
    opposite sidewalls;
    a plurality of wheels arranged between said opposite sidewalls, said wheels being selectively pivotable about respective generally vertical axes to divert or steer articles being conveyed therealong; and
    a motorized roller having an internal motor operable to rotate a roller portion of said motorized roller relative to a shaft portion of said motorized roller, said motorized roller being positioned generally along said plurality of wheels and operable to rotatably drive said plurality of wheels via a plurality of drive members reeved around said motorized roller and respective ones of said wheels.

2. The diverter system of claim 1, wherein said wheels are pivotally mounted to a base plate positioned between said opposite sidewalls.

3. The diverter system of claim 2, wherein said motorized roller is positioned beneath said base plate, said base plate including a plurality of slots to receive said drive members therethrough.

4. The diverter system of claim 1, wherein said at least one row comprises two rows, said wheels of said two rows being rotatably driven via said motorized roller.

5. The diverter system of claim 4, wherein said motorized roller is positioned generally along one of said rows and an idler roller is positioned generally along the other of said rows.

6. The diverter system of claim 5, wherein said motorized roller is operable to rotatably drive said idler roller and said wheels of said one of said rows, while said idler roller rotatably drives said wheels of said other of said rows via a plurality of drive members reeved around said idler roller and respective ones of said wheels of said other of said rows.

7. The diverter system of claim 1 including a steering system operable to selectively pivot or steer said wheels, said steering system comprising a rotatable drive gear and at least one rack member extending at least partially along said row of wheels, wherein rotation of said drive gear causes a corresponding translational movement of said rack member and wherein said corresponding translational movement of said rack member causes a corresponding pivotal movement of at least some of said wheels of said row.

8. The diverter system of claim 7, wherein at least one of said wheels includes a gear plate that engages said drive gear, said at least one of said wheels drivably engages said at least one rack member, wherein rotation of said drive gear causes pivotal movement of said at least one of said wheels and wherein said pivotal movement of said at least one of said wheels causes said corresponding translational movement of said rack member.

9. The diverter system of claim 8, wherein said wheels include gear portions which drivably engage a corresponding gear portion of said at least one rack member.

10. The diverter system of claim 8, wherein said at least one row comprises at least two rows and said at least one of said wheels comprises a wheel of two of said at least two rows, wherein rotation of said drive gear causes pivotal movement of said two wheels and wherein said pivotal movement of said two wheels causes said corresponding translational movement of said rack member.

11. The diverter system of claim 8, wherein said wheels are rotatably mounted to respective mounting assemblies, which are pivotally mounted at said diverter system via respective pivot shafts of said mounting assemblies.

12. The diverter system of claim 11, wherein each said mounting assembly comprises a pair of side members which each comprise a shaft portion and an axle portion, said axle portions rotatably attaching at respective ends of said wheel, said shaft portions joining together to form said pivot shaft.

13. The diverter system of claim 1, wherein said opposite sidewalls of said diverter system are configured to mount to and between opposite sidewalls of a conveyor section.

14. The diverter system of claim 13 including a control for controlling said diverter system, said control being mounted at the conveyor section and generally beneath the location where said sidewalls of said diverter system are mounted.

15. A diverter system comprising:
opposite sidewalls;
a plurality of wheels arranged in at least one row, said plurality of wheels being pivotally mounted to a base plate extending between said opposite sidewalls; and
a steering system operable to selectively pivot or steer said wheels, said steering system comprising a rotatable drive gear and at least one rack member extending at least partially along said row of wheels, wherein rotation of said drive gear causes a corresponding translational movement of said rack member and wherein said corresponding translational movement of said rack member causes a corresponding pivotal movement of at least some of said wheels of said row.

16. The diverter system of claim 15, wherein at least one of said wheels includes a gear plate that engages said drive gear, said at least one of said wheels drivably engages said at least one rack member, wherein rotation of said drive gear causes pivotal movement of said at least one of said wheels and wherein said pivotal movement of said at least one of said wheels causes said corresponding translational movement of said rack member.

17. The diverter system of claim 16, wherein said wheels include gear portions which drivably engage a corresponding gear portion of said at least one rack member.

18. The diverter system of claim 16, wherein said at least one row comprises at least two rows.

19. The diverter system of claim 18, wherein said at least one of said wheels comprises a wheel of two of said at least two rows, wherein rotation of said drive gear causes pivotal movement of said two wheels and wherein said pivotal movement of said two wheels causes said corresponding translational movement of said rack member.

20. The diverter system of claim 15, wherein said wheels are rotatably mounted to respective mounting assemblies, which are pivotally mounted along said rack member via respective pivot shafts of said mounting assemblies.

21. The diverter system of claim 20, wherein each said mounting assembly comprises a pair of side members which each comprise a shaft portion and an axle portion, said axle portions rotatably attaching at respective ends of said wheel, said shaft portions joining together to form said pivot shaft.

22. The diverter system of claim 15, wherein said wheels are rotatably driven via a motorized roller and a plurality of drive members reeved around said motorized roller and a respective one of said wheels.

23. The diverter system of claim 22, wherein said at least one row comprises two rows, said wheels of said two rows being rotatably driven via said motorized roller.

24. The diverter system of claim 23, wherein said motorized roller is positioned generally along one of said rows and an idler roller is positioned generally along the other of said rows.

25. The diverter system of claim 24, wherein said motorized roller is operable to rotatably drive said idler roller and said wheels of said one of said rows, while said idler roller rotatably drives said wheels of said other of said rows via a plurality of drive members reeved around said idler roller and respective ones of said wheels of said other of said rows.

26. The diverter system of claim 15, wherein said diverter system comprises a modular diverter system, said opposite sidewalls of said diverter system are configured to mount to and between opposite sidewalls of a conveyor section.

27. The diverter system of claim 26 including a control for controlling said diverter system, said control being mounted at the conveyor section and generally beneath the location where said sidewalls of said diverter system are mounted.

28. A method for diverting articles that are being conveyed along a conveying surface, said method comprising:
providing a conveyor section having a conveying surface operable to convey articles in a first direction of conveyance;
providing a diverter system adjacent to said conveying surface, said diverter system having a plurality of wheels arranged in at least one row between opposite sidewalls and a motorized roller having an internal motor operable to rotate a roller portion of said motorized roller relative to a shaft portion of said motorized roller, said motorized roller being positioned generally along said plurality of wheels and being drivably connected to at least some of said wheels via respective drive members;
conveying an article in said first direction of conveyance from said conveying surface onto said wheels of said diverter system;
rotating said roller portion of said motorized roller via activation of said internal motor to rotationally drive said wheels of said diverter system via said drive members, whereby rotation of said wheels conveys the article over said diverter system; and
pivoting said wheels of said diverter system about respective pivot axes to convey articles in a second direction of conveyance that is different from said first direction of conveyance.

29. The method of claim 28, wherein said diverter wheels are arranged in two rows, said motorized roller being positioned generally along one of said rows and an idler roller being positioned generally along the other of said rows.

30. The method of claim 29, wherein rotating said roller portion rotationally drives said wheels of said one of said rows via respective drive members and rotationally drives said idler roller, said idler roller rotationally driving said wheels of said other of said rows via a plurality of drive members reeved around said idler roller and respective ones of said wheels of said other of said rows.

31. The method of claim 28 including steering said wheels via rotation of a rotatable drive gear of a steering system, whereby rotation of said rotatable drive gear causes a corresponding translational movement of a rack member and whereby said corresponding translational movement of said rack member causes a corresponding pivotal movement of at least some of said wheels of said row.

32. The method of claim 31, wherein said at least one row comprises at least two rows and said at least one of said wheels comprises wheels of two adjacent rows, wherein rotation of said drive gear causes pivotal movement of said two wheels and wherein said pivotal movement of said two wheels causes said corresponding translational movement of respective rack members which in turn causes rotation of the other wheels in said at least two rows.

33. The method of claim 28, including installing said diverter system via insertion of a diverter system module between opposite sidewalls of said conveyor section.

34. The method of claim 33 including providing a control for controlling said diverter system, and mounting said control at said conveyor section and generally beneath the location where said diverter system is mounted.

* * * * *